April 8, 1958  G. H. LEONARD  2,829,583
COFFEE MAKER
Filed April 14, 1953  5 Sheets-Sheet 1

INVENTOR
G. H. Leonard
BY
A. H. Golden
ATTORNEY

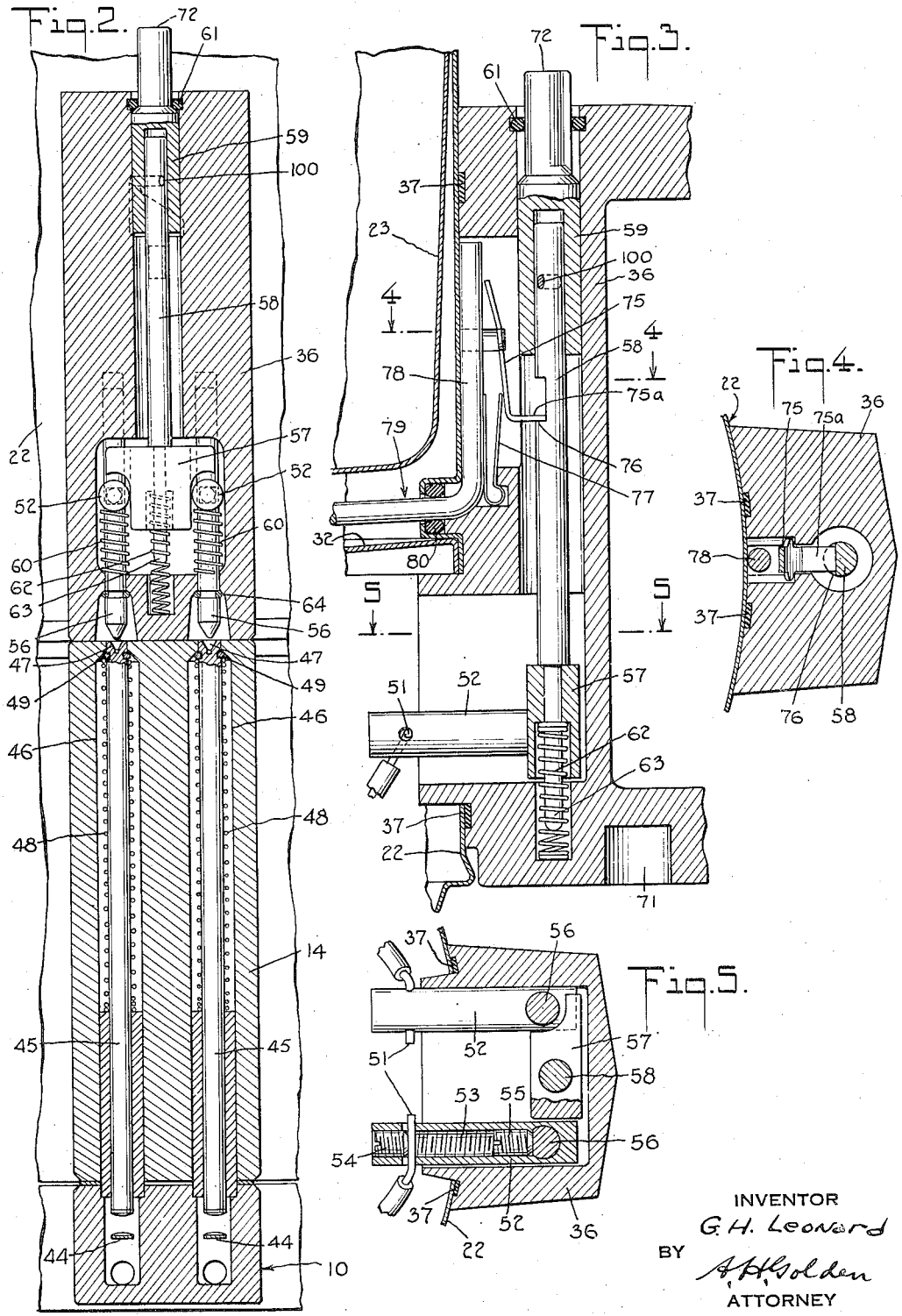

April 8, 1958 G. H. LEONARD 2,829,583
COFFEE MAKER

Filed April 14, 1953 5 Sheets-Sheet 3

INVENTOR
G. H. Leonard
BY
A. H. Golden
ATTORNEY

April 8, 1958 G. H. LEONARD 2,829,583
COFFEE MAKER
Filed April 14, 1953 5 Sheets-Sheet 4
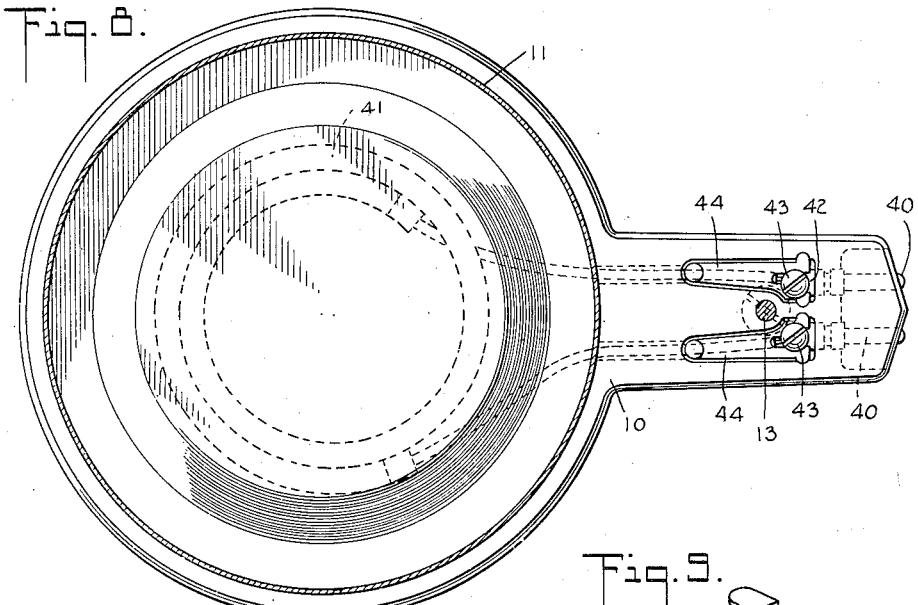
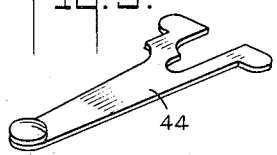
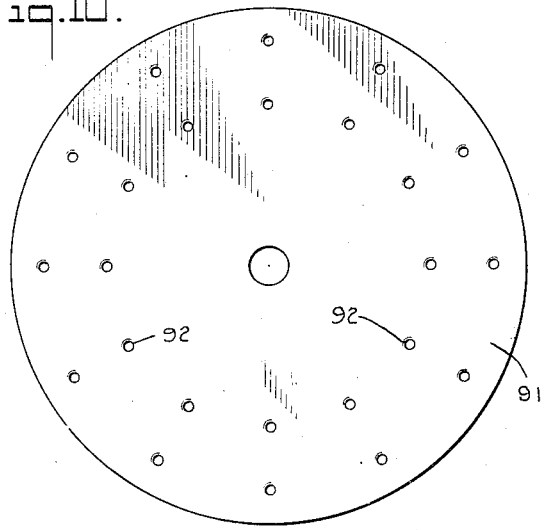
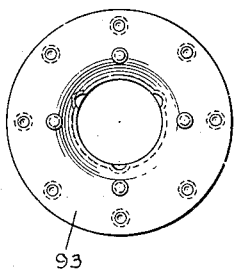
INVENTOR
*G. H. Leonard*
BY *A. H. Golden*
ATTORNEY April 8, 1958 G. H. LEONARD 2,829,583
COFFEE MAKER
Filed April 14, 1953 5 Sheets-Sheet 5
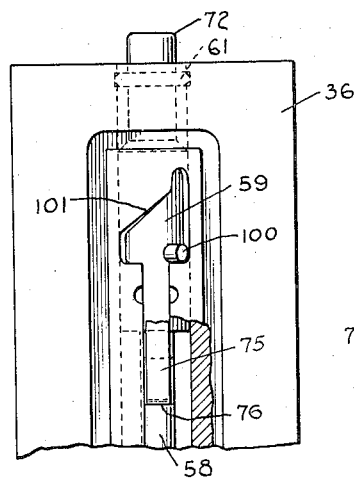
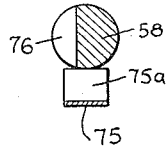
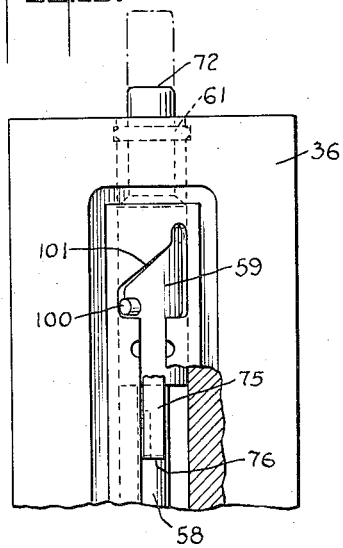
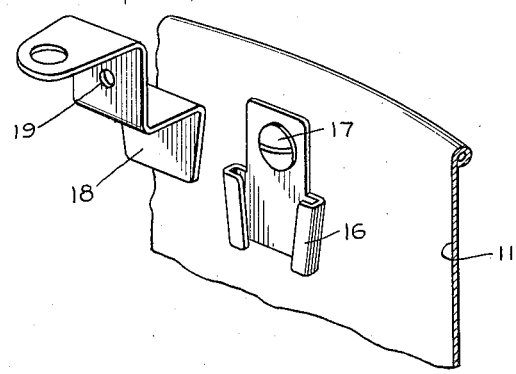
INVENTOR
G. H. Leonard
BY
ATTORNEY United States Patent Office 2,829,583
Patented Apr. 8, 1958

2,829,583

COFFEE MAKER

George H. Leonard, Darien, Conn., assignor to Reginald W. Okie, Greenwich, Conn.

Application April 14, 1953, Serial No. 348,743

13 Claims. (Cl. 99—282)

This invention relates to a coffee maker, and more particularly to that type of coffee maker disclosed in the applications of Reginald W. Okie, Ser. No. 172,103 and Ser. No. 204,371, now Patent No. 2,725,008, dated November 29, 1955. More particularly, the invention to be claimed in this application relates to means for effectively controlling the electric circuit of the heating element of a coffee maker while making possible the effective assembly of the various parts of a coffee maker in proper sequence, and without exposure of the operator to danger.

The coffee maker to which my invention relates is of the type in which an upper water container is assembled to a lower container for the movement of heated water from the upper container downwardly into the lower container, the water in its movement passing through ground coffee.

As a feature of my invention, the heating element of the coffee maker is mounted in the upper container while the base contacts for the coffee maker are carried in the lower or base container. It, therefore, becomes necessary to make an effective electrical connection between the upper container and the base container, and this is accomplished in what I believe to be a unique and extremely effective manner. Thus, as one feature of the invention, there are no exposed "live" contacts on the base container. Therefore, it is not possible to short exposed contacts inadvertently. Those skilled in the art will recognize that this is an extremely valuable feature, since there is always a possibility of shorting exposed live contacts in an appliance of the class described.

As a further particular feature of this part of the invention, the assembly of the upper container to the base container, makes it possible to move means for closing effectively a circuit from the base contacts to the heating element carried by the upper container. Even more particularly, a switch construction carried by the upper container is moved into position to effect the closing of a circuit within a chamber of the lower or base container. In other words, the live or final contact between the power circuit and the heating element is closed within this chamber, making it impossible to close effectively a circuit except when the two containers are assembled to one another. Also, no possibility for short circuiting is present.

As a further feature of my invention, the means for closing the circuit are carried by the upper container, and more particularly by a handle secured to the upper container. Means in the form of a detent, preferably, serve to maintain in circuit closing position the push button that is preferred to close the circuit through the heating element. For controlling this detent I employ a novel mechanism actuated by a thermostat, and this thermostat is preferably the same thermostat that I utilize for controlling the flow of water from the upper container to the lower container.

More particularly, I utilize a thermostat employing a rod-like member that is adapted to open a valve in the water container when the water reaches a particular temperature, and it is the additional movement of this rod-like element of the thermostat after the water has entirely moved outwardly from its container, that effects the movement of a novel form of element. This novel element extends from underneath the water container towards the handle secured to the container, and effects the operation of the detent for releasing the push button. The push button, when released, moves to an upper circuit opening position as has already been emphasized, but the final opening of the circuit is within a closed chamber.

As a further feature of my invention, the preferred switch operating device carried by the handle of the upper container is in the form of a push button that moves axially from a circuit opening position to a circuit closing position and back to a circuit opening position. When locked by the detent in circuit closing position, it may be rotated manually, however, to a position releasing it from the detent for movement axially back to a circuit opening position. More particularly, the final axial movement always restores the push button to its original position from which it is operated to close the circuit.

A further feature of my invention resides in the means for securing the ground coffee relatively to the lower or base chamber, these means being in the form of a bracket carried by the coffee container and moving into and out of a bracket support.

A further feature of my invention resides in the formation and mounting of the switch closing means so as to prevent the movement of moisture into the interior of the handles or other parts supporting the circuit making and breaking structures.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 2 is a section taken substantially along lines 2—2 of Fig. 1.

Fig. 3 is an enlarged view of certain of the parts shown in Fig. 1 in a position corresponding to the closing of the circuit of the heating element of the coffee maker.

Figs. 4 and 5 are respectively sections taken along lines 4—4 and 5—5 of Fig. 3.

Figure 1:
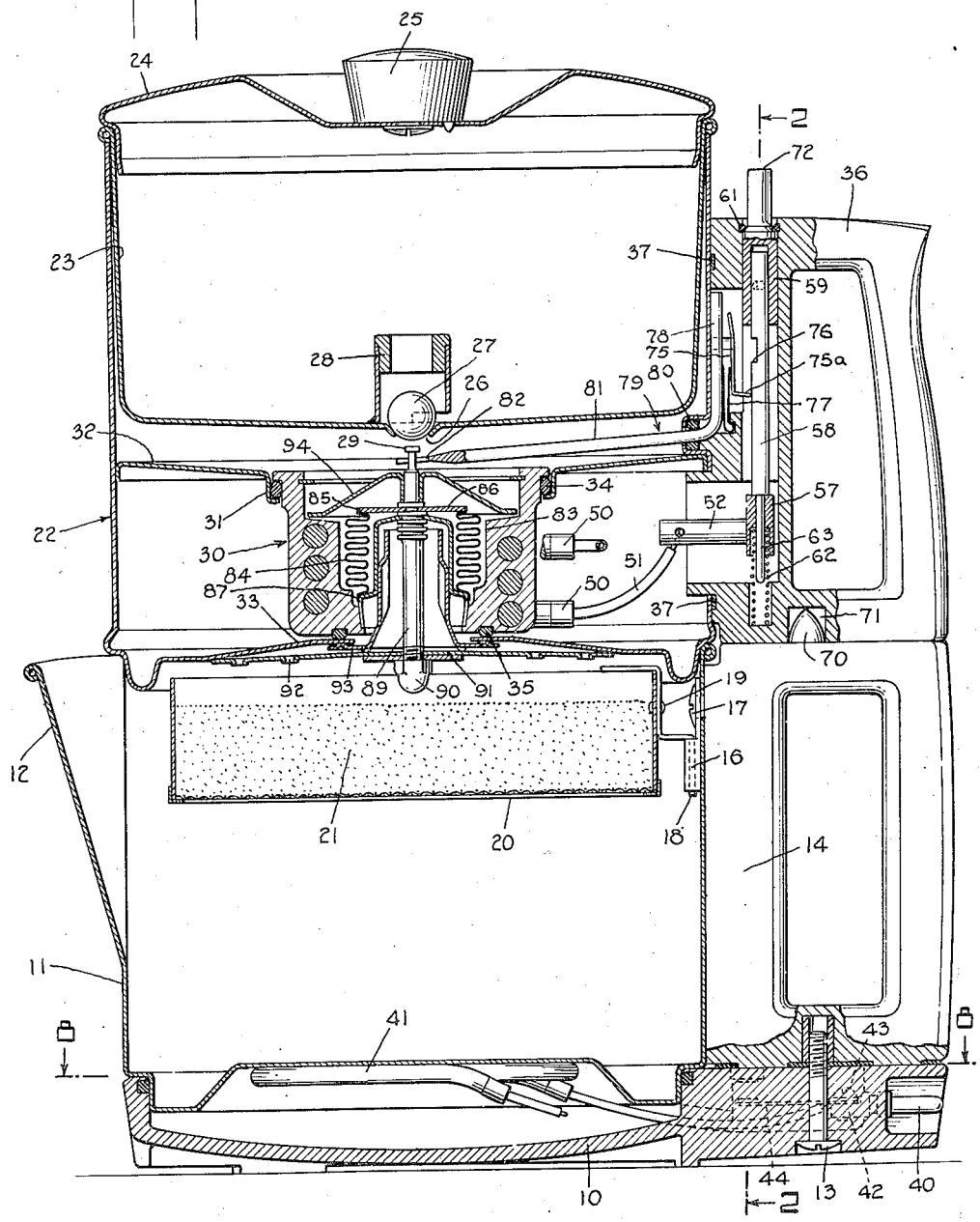
Fig. 1 is a vertical section through a coffee maker embodying my invention.
Figure 6:
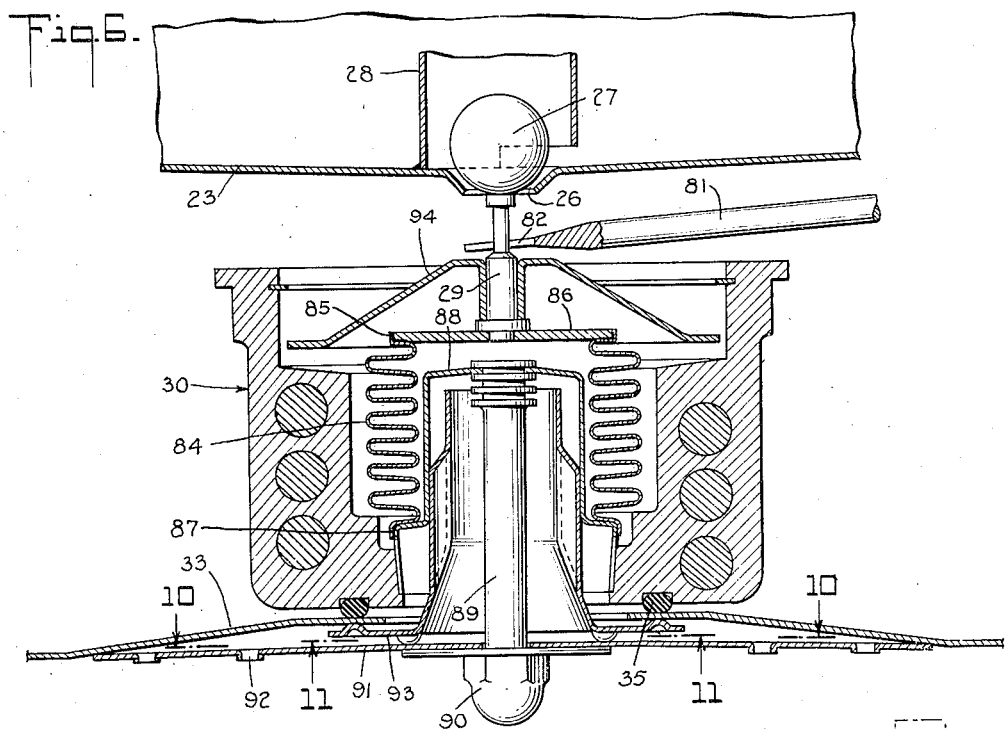

Fig. 6 is an enlarged view of certain of the parts of Fig. 1.

Figure 7:
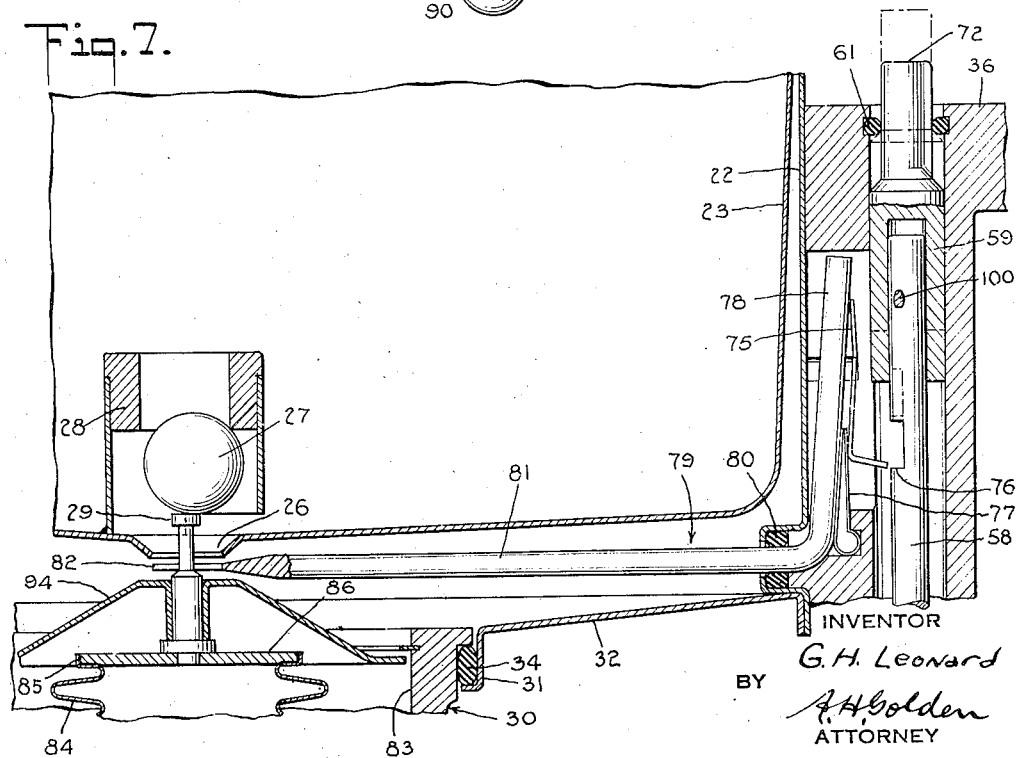

Fig. 7 is a view showing parts of Figs. 3 and 6 in a further position.

Fig. 8 is a section taken along lines 8—8 of Fig. 1.

Fig. 9 is a perspective view of a contact element shown in Fig. 8.

Fig. 10 is a view taken substantially along lines 10—10 of Fig. 6, showing a water directing plate forming part of my invention.

Fig. 11 is a view taken along lines 11—11 of Fig. 6, showing a part of the thermostat of my invention.

Figs. 12 and 13 are enlarged views showing means for controlling the operation of the push button switch of my coffee maker.

Fig. 14 is a view showing parts of Fig. 4 in a different position.

Fig. 15 shows in detail the means for holding the ground coffee container in position.

Referring now more particularly to the drawings, and especially Fig. 1, reference number 10 designates a base casting that may be formed of plastic or some other suitable insulating material. Base 10 is part of the lower or base container and carries a coffee container 11 secured thereto, this container 11 having a spout 12 as part thereof. A pair of screw studs 13 carry a handle member 14 that is adapted when secured in position to form an integral part of the lower or base container.

As shown best in Fig. 15, a bracket support 16 is secured by a screw 17 to the container 11. The bracket support 16 is adapted to have inserted therein a bracket 18 that is riveted at 19 to a ground coffee container 20. In Fig. 1 I show the ground coffee 21 within the ground coffee container 20, and those skilled in the art will appreciate that the ground coffee 21 will have hot water passed therethrough and that this water will move outwardly through the bottom of the container 20 into container 11 for final disposition outwardly through the spout 12.

The upper container is designated broadly by reference number 22, and is adapted to be assembled to the lower container as is well illustrated in the drawings, being shaped for the particular purpose as will be quite apparent. As best seen in Fig. 1, the upper container 22 carries a suitable water container 23 that in turn is closed by a lid 24 having the usual knob handle 25. The bottom of the water container is formed with an opening 26 controlled by a ball valve 27 that is in turn held against substantial movement away from the opening 26 by guide structure 28. The ball valve 27 is in turn controlled by a thermostat operated plunger 29 in a manner to be described presently.

The water moving from the container 23 is adapted to be heated by a heating element 30 that is particularly formed so as to be supported by a flange 31 of a plate 32 secured as an integral part of the container 22. The heating element is further supported by a portion 33 of the bottom of the container 22 as is well apparent from a study of Fig. 1. It will be noted further from Fig. 1 that a sealing member 34 is interposed between flange 31 and the heating element 30, and that a further sealing element 35 is interposed between the portion 33 of the container 22 and the said heating element.

A handle 36, similar in some ways to the handle 14, is secured to the upper container 22 so as to form an integral structure therewith. This handle is formed with an internal chamber to house certain means, and this chamber is sealed from the upper container 22 by sealing means 37 (Figs. 1, 3, and 4) that extend completely about the opening leading to the chamber.

I have thus described generally the basic structure of my coffee maker, and shall now indicate more in detail the manner in which certain other parts thereof operate and are assembled relatively thereto.

Referring first to Figs. 1, 8, and 9, the base 10 carries a pair of prongs 40 extending outwardly therefrom and adapted for contact with a conventional electric plug to close a circuit through the coffee maker. Connected directly to the prongs 40 is an auxiliary heating element 41. This auxiliary heating element is adapted to heat at all times any coffee that is placed into the lower container 11, the heat generated by the heating element 41 being merely sufficient to maintain warm the coffee that has already been made.

Each of the prongs 40 has a rearward portion 42 that through a screw 43 secures a contact 44 thereto, one of the contacts 44 being best shown in Fig. 9. Referring now to Fig. 2, each of the contacts 44 is shown within the base 10, and adapted for contact with each of these contacts is a rod 45. Each rod 45 extends upwardly through a bore 46 in the handle 14, terminating in a V depression 47 lying substantially at the upper surface of the handle 14. A spring 48 presses each rod upwardly through coaction with a sealing ring 49. It is obvious that the sealing rings 49 prevent the entry of moisture into the bores 46 and downwardly into the interior of the handle 14. It is obvious also that the rods 45, when in their position of Fig. 2, are spaced from the live contacts 44. The contacts 44 are termed "live" since it is assumed that the power line will be connected to the prongs 40 whenever it is desired to use the coffee maker.

The heating element 30, as best seen in Figs. 1 and 6, is formed of a solid block of suitable metal and carries the usual electric heating wires terminating in terminals 50. These terminals 50 are connected by suitable wires 51, as best seen in Figs. 1 and 5, with a pair of pins 52 illustrated also in Fig. 3. Each pin 52 is threaded as at 53 for a stud 54 that acts to secure one of the wires 51 to each of the pins 52. Further, an interior stud 55 acts to secure each of the pins 52 to a plunger pin 56, there being naturally two of these plunger pins. The pair of plunger pins 56 control and are controlled by a suitable plastic member 57. Extending upwardly through this plastic member 57 is a rod 58 secured to a push button 59. A spring 60 surrounds each of the plunger pins 56 and acts to push the entire assembly including the piece 57 and push button 59 to the upper position of Fig. 2. A sealing and limiting ring 61 coacts with push button 59 as is quite apparent in Fig. 2 to seal the interior of the handle 36 from moisture. For assisting the springs 60 pressing the plunger pins 56 and piece 57 upwardly, I utilize a further spring 62 coacting with a guide pin 63 forming an extension of rod 58. Rod 58 and push button 59 rotate relatively to piece 57 for a purpose to be indicated presently. O-rings 64 fit about the plunger pins 56, these O-rings serving as limit means and also as sealing means to prevent movement of moisture upwardly into the open chamber of the handle 36 in which are mounted the several parts I have described.

The lower end of the two plunger pins 56 are tapered for coaction with the V depressions 47 of the rods 45. In addition, the plunger pins 56 are, of course, always in direct wired contact with the heating element 30 as clearly indicated.

Let us consider now what happens when the upper container is assembled to the lower container as shown in Fig. 1. The proper assembly of the parts is effected by movement of the bottom of the container 22 into proper relation to the rim of the lower container 11 carried by the base 10. For locating the handle 36 relatively to the handle 14, the handle 14 carries a guide lug 70 coacting with a depression 71 in the handle 36, as best seen in Fig. 1. In this position of the parts, the electric control means are in the condition shown in Fig. 2. Thus, the plunger pins 56 are entirely within the handle 36 and are in alignment with rods 45, but spaced therefrom. In addition, the lower ends of the rods 45 are spaced from the live contacts 44.

To complete a circuit through the heating element 30, push button 59 is depressed through pressure manually downwardly on its end 72. The push button will move to its position of Fig. 3 and this movement will through piece 57 first carry the lower ends of the plunger pins 56 into the V depressions 47, and will then move the rods 45 downwardly against the live contacts 44. This will complete a circuit from one prong 40 through one contact 44, one rod 45, one plunger pin 56, one pin 52, one wire 51, through the heating element 30, a second wire 51, a second pin 52, and back to the other prong 40, as will now be quite apparent. Actually, there need be only one live connection made in the final step, but I prefer to use two. However, the use of one or two does not vary the invention and the claims covering two should be considered from this viewpoint.

It is desired that once the push button 59 is depressed at 72 into the position of Fig. 3, it remains depressed until the coffee making cycle has been completed. For this purpose there is utilized a detent 75 best shown in Figs. 3 and 4. This detent 75 is formed with a part 75a adapted to coact with a shoulder 76 on the rod 58 to hold the rod in its position of Fig. 3. The detent 75 is retained in the particular position by one arm of a spring 77 that extends between the detent 75 and the vertical arm 78 of a control rod 79. The control rod 79 extends outwardly from the handle 36 through a sealing ring 80 and terminates in a substantially horizontal arm 81, as best seen in Figs. 1, 6, and 7. Arm 81 is formed with an opening 82 through which extends the plunger 29 of the thermostat, it being understood that this opening is of such size that the upward movement of the plunger 29 will move the arm 81 from its position of Figs. 1 and 6 to the position of Fig. 7 for purposes presently to be indicated more in detail.

The heating element 30 of my invention is formed with a central opening 83 within which lies the bellows 84 of the thermostat, the construction of which per se is not the invention herein claimed. The upper end of the bellows 84, as best seen in Fig. 6, is soldered at 85 to a plate 86 that carries the plunger 29. The lower end of the bellows 84 is soldered at 87 to a part 88 that is in turn secured to a central rod 89. Fluid is contained within the chamber defined between the bellows 84, the plate 86 and the part 88, it being obvious that when the fluid is heated and expands, the part 88 being held against movement, the bellows will extend longitudinally upwardly moving the plate 86 upwardly, and carrying upwardly also the plunger 29.

It is the function of the rod 89 to hold the part 88 against movement upwardly, a nut 90 securing the rod relatively to the plate 91 shown in Fig. 6, and shown also in plan view of Fig. 10. Plate 91 is formed with a series of openings 92 for the flow of water downwardly to the ground coffee 21. The water flows to the plate 91 over a baffle 93 (Fig. 11) that is secured to the internal part 88 of the thermostat as is quite apparent from Fig. 6. Those skilled in the art will now appreciate that when the heating element is energized, as outlined above, it will tend to heat the thermostat and expand the bellows 84 upwardly to lift plunger 29. Plunger 29 will move the ball 27 upwardly from its position of Fig. 1 to its position of Fig. 6, and water will flow immediately from the water container 23 downwardly onto a spreader 94 secured to plunger 29. This water will then flow downwardly between the outer surface of the bellows 84 and the internal bore 83 of the heating element 30 and will tend to cool the thermostat somewhat to close again the valve at ball 27 until the water is at the desired temperature. When all of the water has flowed out of the water container 23, the temperature of the heating element and of the thermostat bellows will naturally rise sharply, thereby bringing the plunger 29 above its position of Fig. 6 and to its position of Fig. 7. This upward movement of the plunger 29 will act at 82 on arm 81 of control rod 79 to move that rod to its position of Fig. 7 as has already been indicated. In this position of the parts the vertical arm 78 will move the detent to its release position away from the shoulder 76 of rod 58, and the rod and push button 59 will move to the dash-and-dotted line position of Fig. 7. This position is, of course, the position of Fig. 2. The circuit through the heating element will now be broken, and heat will now be supplied only to the lower container 11 through the heating element 41. This heat will be sufficient merely to maintain warm the coffee that has already been prepared.

It frequently happens that once the push button is depressed at 72 from its position of Fig. 2 to its position of Fig. 3, it becomes desirable to open the circuit of the heating element 30 before the coffee making cycle has been completed. To provide for such an event, the push button body 59 is capable of rotation with the rod 58 to carry the rod 58 from its position of Fig. 4 to its position of Fig. 14. This rotation, as is quite apparent, will carry the shoulder 76 away from the operating zone of the part 75a of the detent 75, releasing the rod 58 and push button 59 for movement under the pressure of the three springs 60, 60 and 62 to the off position of Fig. 2. This rotary movement of the rod 58 is controlled by a pin 100 as best seen in Fig. 12. Thus, if we consider the rod as rotating from its position of Fig. 12 to the position of Fig. 13, the shoulder 76 is withdrawn from coaction with part 75a of the detent 75 as seen in Fig. 14. Now the rod 58 and the push button 59 may move upwardly from the position of Fig. 13 under the pressure of the springs as just set forth. During this upward movement a guide surface 101 coacts with the pin 100, to rotate the push button 59 and rod 58 back to a position in vertical alignment with the position of Fig. 12. In other words, if push button 59 is depressed to close a circuit, and is then rotated manually to open the circuit, the push button will automatically be rotated back to its initial position during its release movement, and will be ready once again to function in its correct manner, due to the realignment of the shoulder 76 relatively to the part 75a of the detent 75.

I believe that those skilled in the art will now fully appreciate the contribution of my invention and its manner of operation, involving the novel assembly of a pair of containers and a pair of handles, the control of the circuits, the sealing of the control elements, the making of the circuit of the heating element within a protected chamber, the several controls of the switch means, and the various other parts that I have set forth in considerable detail.

I now claim:

1. In a coffee maker of the class described, a lower container having a pair of base electrical contacts fixed relative to the container and adapted for connection with a source of electricity, a movable assembly including a pair of moving contacts carried by said lower container, movable into contact with the base contacts by effecting movement of said assembly and normally held separated from said base contacts, an upper container mating with the lower container and having a heating element, a pair of upper contacts for said heating element on said upper container, and said upper contacts being movable such that, when said containers are assembled to one another, they may be moved against the moving assembly to effect movement of said moving contacts against said base contacts whereby to close a circuit through the various contacts to said heating element.

2. In a coffee maker of the class described, a lower container having an internal chamber, a pair of base electrical contacts fixed relative to the container and within said chamber adapted for connection with a source of electricity, a movable assembly including a pair of moving contacts within said chamber, movable into contact with the base contacts by effecting movement of said assembly and normally held separated from said base contacts, an upper container adapted for assembly to said lower container and having a heating element, a pair of upper contacts for said heating element on said upper container, the assembly of said containers positioning said upper contacts to move against the movable assembly and effect movement of said moving contacts against said base contacts whereby to close a circuit through the various contacts to said heating element.

3. In a coffee maker of the class described, a lower container having a pair of base electrical contacts fixed relative to the container and adapted for connection with a source of electricity, a movable assembly including a pair of lower moving contacts carried by said lower container, movable into contact with the base contacts by effecting movement of said assembly and normally held separated from said base contacts, an upper container adapted for assembly to said lower container and having a heating element, a pair of upper moving contacts for said heating element movable on said upper container, the assembly of said containers effecting the placing of said upper moving contacts in position to effect movement of said lower moving contacts, and means whereby said upper moving contacts are moved to effect movement of said lower moving contacts against said base contacts to close a circuit through the various contacts to said heating element.

4. In a coffee maker of the class described, a lower container having a pair of base electrical contacts fixed relative to the container and adapted for connection with a source of electricity, a movable assembly including a pair of moving contacts carried by said lower container, movable into contact with the base contacts by effecting movement of said assembly and normally held separated from said base contacts, an upper container having a heating element, a pair of upper contacts on said upper container connected to the terminals of said heating elements, said upper contacts occupying in said upper container a position such that they can move said movable assembly to bring the moving contacts into contact with the base contacts when said upper container is assembled to said lower container.

5. In a coffee maker of the class described, a lower container having a pair of base electrical contacts fixed relative to the container and adapted for connection with a source of electricity, a movable assembly including a pair of moving contacts carried by said lower container movable into contact with the base contacts and normally held separated from said base contacts and a pair of conductive rods movable against the movable contacts to effect their movement, an upper container mating with the lower container by effecting movement of said assembly and having a heating element, a pair of upper contacts movably mounted on said upper container and connected to the terminals of said heating elements, said upper contacts occupying in said upper container a position for effective alignment with said moving contacts when said upper container is assembled to said lower container, whereby movement of said upper contacts against the movable rods thereafter effects movement of said moving contacts into contact with said base contacts to close the circuit of said heating element.

6. In a coffee maker of the class described, a lower container having a pair of base electrical contacts fixed relative to the container and adapted for connection with a source of electricity, a low power heating element connected to said base contacts, a movable assembly including a pair of moving contacts carried by said lower container, movable into contact with the base contacts by effecting movement of said assembly and normally held separated from said base contacts, an upper container having a high power heating element, a pair of upper contacts on said upper container connected to the terminals of said heating element, said upper contacts occupying in said upper container a position for movement against the movable assembly to bring said moving contacts and base contacts into contact when said upper container is assembled to said lower container, whereby to close a circuit through said high power heating element, a thermostat in said upper container, and means whereby said thermostat effects the movement of said upper contacts to open the circuit of said high power heating element.

7. In a coffee maker of the class described, a water container, a handle therefor at one side thereof, a heating element for said water container, a valve in the bottom of said container, a thermostat under said valve for opening said valve, a push button switch for said heating element mounted on said handle, a detent carried by said handle for locking said push button in a depressed position when it is pushed into said depressed position, and means extending from said thermostat under said container and into said handle for actuating said detent to release said push button.

8. In a coffee maker of the class described, a water container, a handle therefor at one side thereof, a heating element for said water container, a valve in the bottom of said container, a thermostat under said valve for opening said valve, a push button switch for said heating element mounted on said handle, a detent carried by said handle for locking said push button in a depressed position when it is pushed into said depressed position, an L shaped rod extending from said thermostat under said container and upwardly into said handle for actuating said detent to release said push button, and means whereby said thermostat moves said L shaped rod to actuate said detent.

9. In a coffee maker of the class described, a heating element, a push button movable axially from an initial off position to an on position to close a circuit through said heating element, spring means pressing said push button axially to said initial off position, a detent for locking said push button in on position upon axial movement of said push button to said on position, means for moving said detent to release said push button, and said push button being rotatable while said detent is in locking position to move out of locking relation to said detent whereby to be moved axially by said spring means toward off position, and guide means rotating said push button to said initial off position during said axial movement of said push button.

10. In a coffee maker, a lower member, an upper member, a push button assembly slidable vertically in a through vertical opening of said upper member, a sealing ring for sealing both ends of said through opening while allowing movement of parts of said push button assembly relatively to said opening, a push rod slidable in an opening in said lower member and having an upper end adapted to be contacted by a part of said push button assembly, means maintaining said push rod in an upper position in said lower member, a base contact in said lower member spaced from the lower end of said push rod when said push rod is in said upper position, and the downward sliding of said push button assembly first effecting contact of said part of said push button assembly with said push rod and the contact thereafter of said push rod with said base contact.

11. In a coffee maker, a lower container assembly, an upper container assembly adapted to be applied in superimposed relation to said lower assembly, a push button assembly slidable vertically in a through opening of said upper container assembly, a push rod slidable in an opening in said lower member and having an upper end adapted to be contacted by a part of said push button assembly, means maintaining said push rod in an upper position in said lower member, a base contact in said lower member spaced from the lower end of said push rod when said push rod is in said upper position, and the downward sliding of said push button assembly effecting contact of said part of said push button assembly with said push rod and the contact of said push rod with said base contact.

12. In a coffee maker of the class described, an upper water container, a flow valve in the bottom of the water container, a coffee holder below the upper water container, a thermostat having a generally cylindrical outer surface, a heater element having an inner cylindrical surface close spaced to the thermostat and thereby defining with the thermostat a thin tubular heating flow path for the water between the upper container and the coffee holder, and means controlled by the thermostat extending to said flow valve whereby when said heating element is actuated, the flow valve is opened by the thermostat to allow water to flow downwardly along the flow path to the coffee holder.

13. The coffee maker of claim 12 in which the flow path terminates above the coffee holder in a distributing head having multiple perforations over a large area above the coffee holder.

References Cited in the file of this patent

UNITED STATES PATENTS

| | | |
|---|---|---|
| 1,748,297 | Matson | Feb. 25, 1930 |
| 1,947,232 | Smith | Feb. 13, 1934 |
| 2,005,764 | Wilcox | June 25, 1935 |
| 2,180,655 | Abbate | Nov. 21, 1939 |
| 2,180,733 | Fowler | Nov. 21, 1939 |
| 2,215,837 | Pinckney | Sept. 24, 1940 |
| 2,230,304 | Locke | Feb. 4, 1941 |
| 2,292,853 | Wilcox | Aug. 11, 1942 |
| 2,422,974 | Newell | June 24, 1947 |
| 2,566,914 | Worst | Sept. 4, 1951 |
| 2,725,008 | Okie | Nov. 29, 1955 |

FOREIGN PATENTS

| | | |
|---|---|---|
| 364,271 | Great Britain | Jan. 7, 1932 |
| 839,984 | Germany | May 26, 1952 |